United States Patent [19]

Shah et al.

[11] Patent Number: 5,235,138

[45] Date of Patent: Aug. 10, 1993

[54] PENETRATION PLUG FOR PRESSURE VESSELS

[76] Inventors: Jagdish H. Shah, 41 Abrams Rd., Cheshire, Conn. 06410; Cliff Evans, 12 Ashford La., Newtown, Conn. 06470; Donald D. Stenbaugh, 248A Oakville Ave., Waterbury, Conn. 06708

[21] Appl. No.: 720,058

[22] Filed: Jun. 24, 1991

[51] Int. Cl.$^5$ .................. H01B 17/30; F16L 55/00
[52] U.S. Cl. .................. 174/151; 174/65 SS; 174/152 G; 277/123; 138/89
[58] Field of Search ............ 174/151, 23 R, 65 SS, 174/77 R, 99 R, 152 G, 93, 19, 65 G; 277/123, 103, 104, 112, 120, 121; 138/89, 90, 93

[56] References Cited

U.S. PATENT DOCUMENTS

| | | | |
|---|---|---|---|
| 1,541,756 | 6/1925 | Williams | 138/89 |
| 1,851,939 | 3/1932 | Williams | 138/89 |
| 1,851,940 | 3/1932 | Williams | 138/89 |
| 3,135,535 | 6/1964 | Shepard | 174/152 G X |
| 3,314,030 | 4/1967 | Mallett et al. | 336/58 |
| 3,697,089 | 10/1972 | Jacisin et al. | 174/65 SS X |
| 3,772,637 | 11/1973 | Paullus et al. | 174/77 R X |
| 4,267,401 | 5/1981 | Wilkinson | 174/77 R |

*Primary Examiner*—Leo P. Picard
*Assistant Examiner*—Hyung S. Songh
*Attorney, Agent, or Firm*—Robert A. Seemann

[57] ABSTRACT

A first resilient wall having an opening to the outer diameter of the wall for a line through the first wall is squeezed by a second wall having an opening for a line through the second wall, and a third wall and insert. The insert is nested in the third wall. The third wall and insert form between them an opening for passing a line between them, the opening in the third wall being large enough to pass through a termination of the line that is larger in diameter than the line. Material of the squeezed first wall is displaced against the line and against an inner wall of a hole in which the plug is mounted.

8 Claims, 4 Drawing Sheets

PENETRATION PLUG FOR PRESSURE VESSELS

BACKGROUND OF THE INVENTION

1. Field of the Invention

The invention relates to sealing for conduits, cables and conductors, more specifically to a plug for passing conduits, cables and the like with enlarged terminations, through an opening in a pressure wall, and providing a pressure seal for the conduits and cables within the wall opening without having to remove the terminations.

2. Description of the Prior Art

It often becomes necessary to temporarily connect a wire, cable, or fluid conduit, which terminates in a connector of larger diameter than the wire, cable or conduit, from an apparatus outside a pressure vessel to a receptacle on an item that is within the pressure vessel without interfering with the primary seal to the vessel.

One way that this is done is by including a plurality of pressure resistant through-connectors and terminations of various sizes and types permanently mounted in a vessel wall seal plate in anticipation of their need. The lines are then connected at the plate on the outside of the vessel by their plugs to mating receptacles or are modified for that purpose (e.g. stripped and soldered) and connected, while another set of lines and plugs are connected to their mates on the plate at the inside of the vessel and connected to the item.

This method limits the number and variety of lines and often requires that they be reworked to obtain suitable termination. Cost, delay and reduced reliability are incurred.

Another way employs a non-porous foam, formed around the wires, cables or fluid conduits, contained by an opening in the vessel wall. This method requires a long curing process for the foam, and does not provide a verifiable seal. The seal is also fragile, and susceptible to performance degradation.

The sealing art for conduits, cables and conductors is also replete with plugs of various designs. For example, M. B. Mallett et al., in U.S. Pat. No. 3,314,030, patented Apr. 11, 1967, discloses a tubular shell that is sealingly welded at one end in an opening in the wall of a high voltage oil filled transformer. The other end of the shell is outside-threaded to receive an inside-threaded cap that is made from an electrical insulative material.

Axially stacked within the shell, are three insulators in order, a hard washer, a resilient grommet, and a hard washer. An opening for a high voltage cable runs axially through the cap, washers, grommet and shell. The opening is of sufficient diameter to receive a stiff insulating sleeve that surrounds the copper wire of the cable. The insulating cover of the cable is cut back so that a portion of the end is received in an expanded annular recess at one end of the insulating sleeve. A minor diameter portion of the cap extends over that end of the insulating sleeve for protection against electrical tracking or surface arcing.

The cable, preferably of uniform diameter, is installed in the plug by pushing it in from one end.

When the cap is screwed down on the shell, it engages an optional intermediate element which in turn axially compresses the washer and grommet assembly against a shell wall. This causes the grommet to expand radially against the insulating sleeve and the shell wall.

As the grommet material is relatively incompressible, a series of annular peripheral grooves are provided, which have a volume equal to or greater than the volume loss of cable insulation under extreme cable deformation. This assures that a spring action is provided within the grommet so that a sealing grip on the cable is maintained.

In another embodiment in which a plurality of wires pass through the plug, each in a hole through the grommet, the spring action is helped by provision of several axial bores in the grommet, on a constant radius, which crush upon lock down pressure, instead of the annular peripheral grooves.

In U.S. Pat. No. 4,267,401, patented May 12, 1981 by W. L. Wilkinson, a pressure plug for a plurality of conductors is described. In the plug, a resilient seal disk includes a plurality of axial openings through the disk, located on a constant radius. Each opening has an axial slit across its outer wall which radially opens the hole to the outer diameter of the disk.

The disk is located between a pair of parallel pressure plates having holes which line up with the openings in the seal disk.

A central axial bore passes through the disk and plate stack for receiving a threaded bolt.

In installation of the plug and wire in a pressure wall, an un-terminated wire or a sealing pin with round head at its back, is pushed through each set of aligned holes from one end of the stack. The bolt is then tightened so that the plates squeeze the seal. The axially compressed seal consequently expands radially, sealing against the surrounding wall of the opening in the pressure vessel wall. It also presses against the through-wire and pins to establish a pressure seal for the contained wires as they pass through the pressure wall.

In an embodiment for installing cables without removing connectors from the cable ends, each hole in the plates is keyhole shaped, with the base of the keyhole opening radially to the outer edge of the plate. Instead of pushing the wire or pin through the stack from one end, the wire or pin is slipped sideways into the keyhole in the plate, and through the slit in the seal disk into the corresponding seal disk hole. The bolt is then tightened as above.

One problem in the above design is that a balance must be struck between the width of the keyhole base opening to accommodate the diameter of the wire with respect to the hole in which it will reside, and the axial pressure area of the plate that is sacrificed due to the width of the keyhole base opening.

Even for the thinnest of wires for which only a narrow plate opening is needed, the keyhole base opening in the plate remains to be a site of reduced axial pressure near the seal disk periphery.

Reduced axial pressure area for bearing on the seal disk results in reduced radial pressure for sealing of the disk material inwardly against the wire, outwardly against the inner face of the pressure wall, and at the radial slit in the seal.

It is one object of the present invention to provide a penetration plug for sealing installation of wire or conduit having a termination, through a pressure wall opening without having to remove the termination.

It is another object to provide the above penetration plug for sealing installation of wire which will receive wire up to the maximum diameter of the hole through the plug, without sacrifice of axial pressure which effects sealing quality.

It is another object to provide a penetration plug with means for monitoring the seal for leakage.

Additional objects and advantages will become apparent from the ensuing description of the invention.

In accordance with the invention, a first resilient wall includes a first opening through the outer diameter of the first wall, for a line through the first wall. A second wall that is stiffer than the first wall forms a second opening for traversing of the second wall by the line. The outer diameter of a third wall that is stiffer than the first wall is unbroken, approximately the same radial size as the resilient first wall, and forms a third opening for receiving a insert. The first wall is squeezed between the second wall and the third wall plus insert by a first means for squeezing, for displacing material of the first wall against the line and against an inner wall of a hole in which the plug is mounted.

A seat in the third wall is shaped for slidingly unencumbered axial movement of the insert from introduction into the seat to a fully seated position in the third wall.

The third wall and first insert form between them an opening for passing the line between them when the insert is seated in the third wall.

One of the third wall and insert is adapted for transferring a portion of squeezing force from the first squeezing means for squeezing to the other of the third wall and insert, for the squeezing of the first wall by the third wall and insert.

A second means for squeezing a fourth resilient wall for displacing the fourth wall against the inner wall of the hole in which the plug is mounted, may comprise a fifth wall with a boss.

The second means for squeezing is operated by the first means for squeezing. The fifth wall and boss contribute to spacing the fourth wall from the second wall for forming a sealed cavity between the resilient first and fourth walls and the inner wall.

BRIEF DESCRIPTION OF THE DRAWINGS

In order that the invention will be more fully comprehended, it will now be described, by way of example, with reference to the accompanying drawings, in which.

DESCRIPTION OF THE PREFERRED EMBODIMENTS

Figure 1:
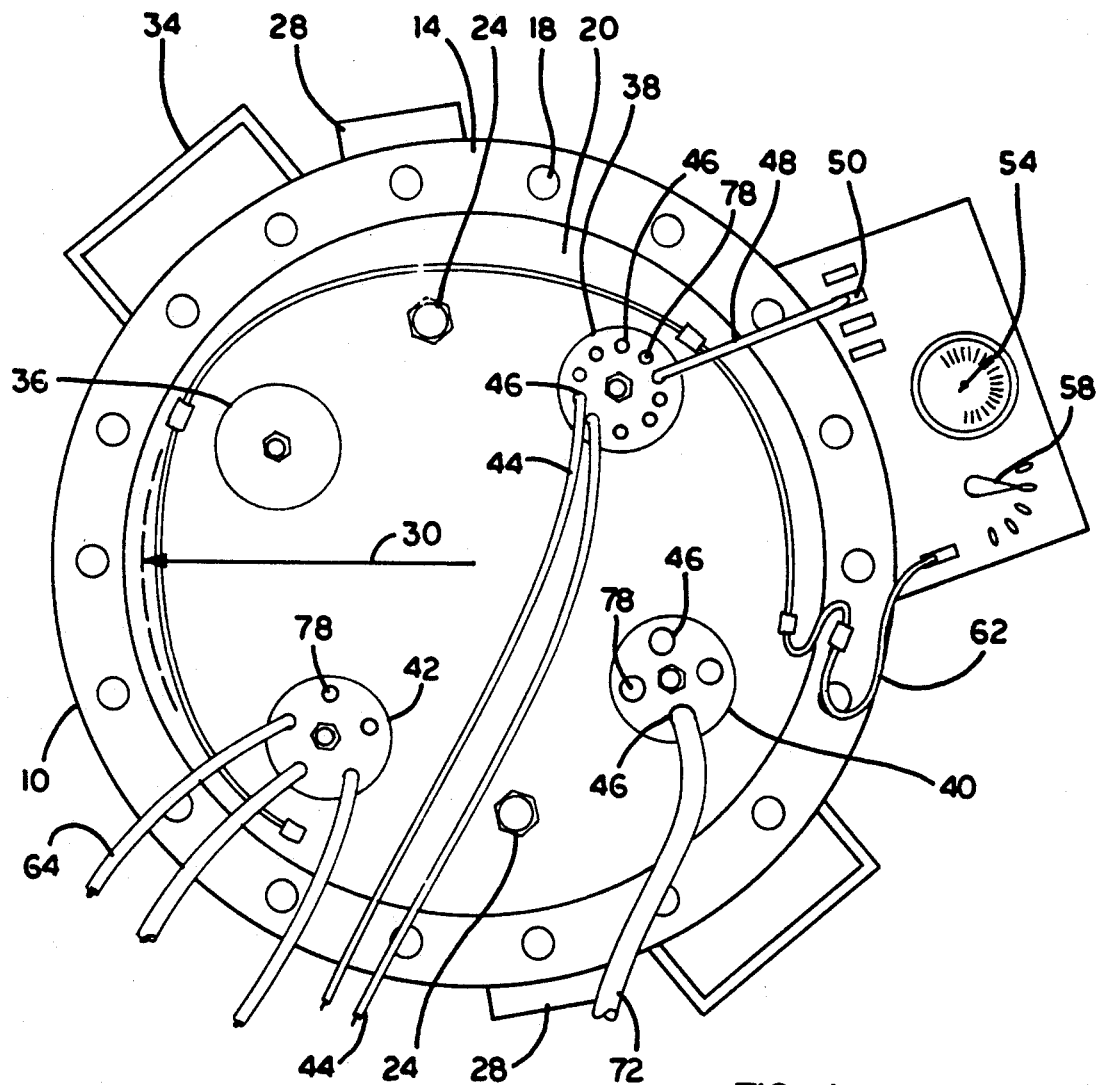
FIG. 1 is a schematic front view of a penetration plug assembly constructed according to the present invention.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIG. 1, penetration plug assembly 10 includes outer frame 14 for mounting the assembly sealingly over an opening in a pressure wall (not shown) by bolt holes 18.

Mounting plate 20 is drawn inward by bolts 24 in rearward depending transverse bar 28, so that a pressure tight seal is established between plate 20 and frame 14. One or more concentric rubber "o" rings about radius 30 between plate 20 and a lip of frame 14 contribute to the seal as is standard in the sealing art.

Handles 34 contribute to positioning the assembly against a pressure wall for mounting it to the wall.

Four pressure plugs, 36, 38, 40 and 42 are located in plate 20.

Plug 36 is simply used to seal a reserve opening in the plate. Plug 38 provides access through the pressure wall to the interior of the pressure vessel for thin wires 44 by way of holes 46. Plug 38 also holds pressure monitor tube 48 which is attached to switched gage fitting 50. Fitting 50 is switched to monitor gauge 54 by valve switch 58 to monitor for pressure leakage in plug 38. In the extreme clockwise position, switch 58 connects fitting network 62 to gage 54 for monitoring pressure leakage of all the plugs as a whole.

Plug 40 provides access for fluid conduit 72. Plug 42 provides access for rubber covered, shielded signal cable 64.

Solid rods 78, of various diameters reside in the unused holes to prevent pressure leakage through the holes.

Figure 2:
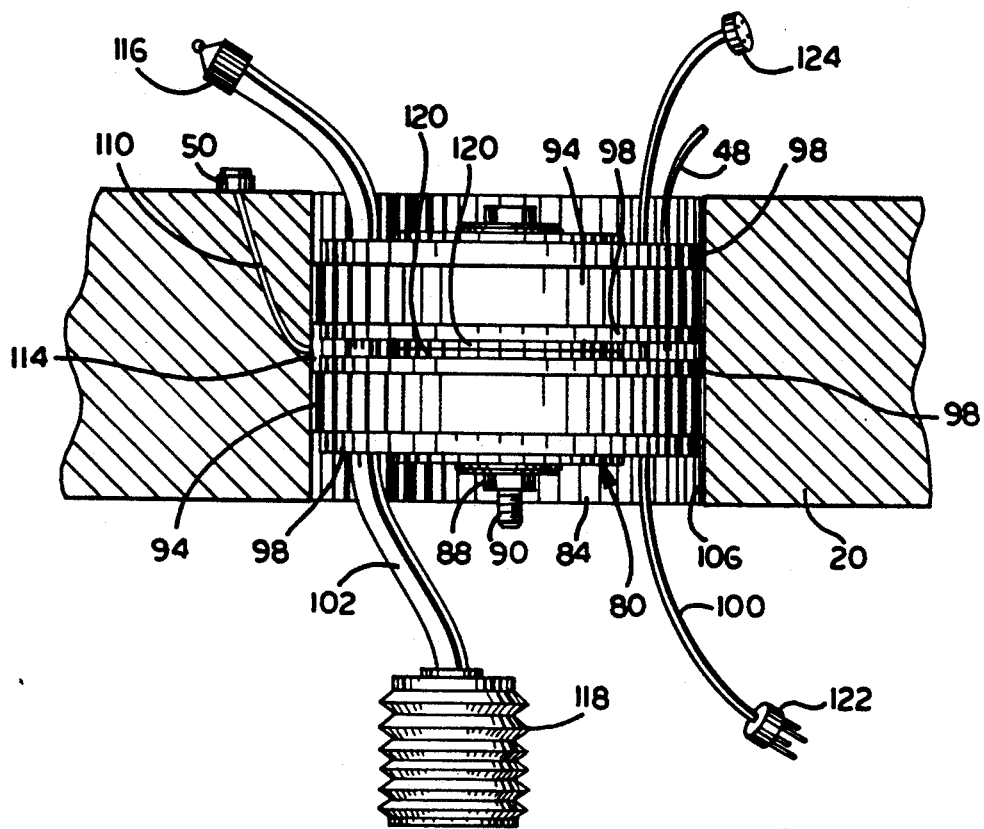
FIG. 2 is a partial cross section side view of a penetration plug mounted in the assembly

Two-stage plug 80 shown in FIG. 2 is mounted sealingly in through-opening 84 in plate 20.

Each resilient seal disk 94, preferably made of 40-60 Durometer rubber, is axially compressed between two ring and insert assemblies 98 when nut 88 is torqued down on bolt 90.

The ring and insert assemblies are preferably stiff in nature, with their components each preferably made from metal such as stainless steel or steel alloy. They may be made, however, from an insulating material or a combination of electrically conductive and nonconductive materials of sufficient physical strength for compression of the resilient seal disk.

When axially compressed, the material of the seal disk is displaced radially inward sealingly around cable 100 and fluid conduit 102, and radially outward sealingly against inner wall 106 of opening 84 in plate 20.

Although penetration plug 80 is shown mounted in plate 20 which is a pressure wall of an assembly 10, it should be understood that a penetration plug of the present invention can be mounted directly in a properly sized opening in any wall.

Pressure test passage 110 connects gage fitting 50 with leak test annulus 114 which is established by abutting bosses 120 and inner wall 106 of wall opening 84. Pressure monitor tube 48 provides another avenue for monitoring the plug for pressure leakage.

Fluid conduit 102 terminates in snap-on coupler 116 at one end and pressure bellows 118 at the other end. Cable 100 terminates in electrical plug 122 at one end and electrical receptacle 124 at the other end. Although the terminus of cable 100 and conduit 102 are of larger diameter than their joiners, they were both installed through penetration plug 80 without need for removing them from their joiners, due to the design benefits of the present invention.

Figure 3:
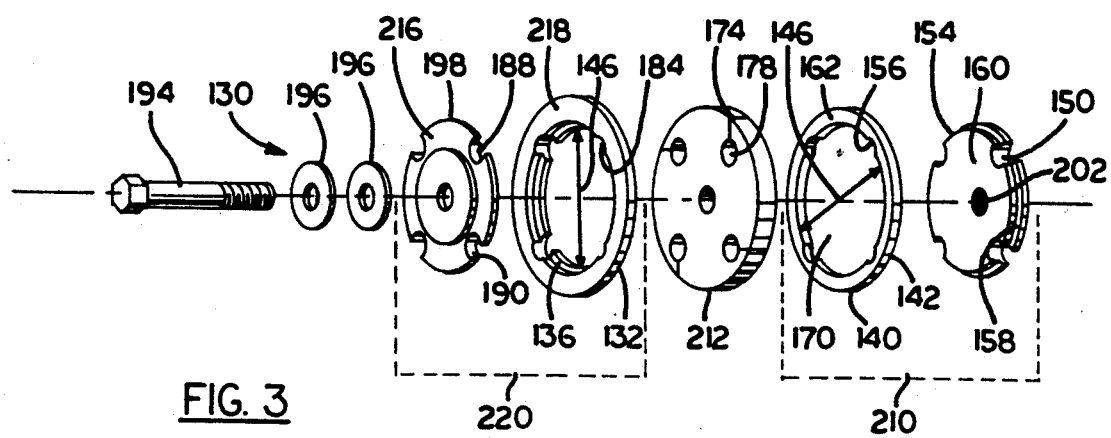
FIG. 3 is an exploded view of a penetration plug.

The reason for this installation capability will become apparent upon review of penetration plug 130 shown in FIG. 3. which shows a preferred embodiment of the penetration plug, penetration plug 130.

Plug 130 comprises ring 132 with inward facing (left facing in FIG. 3) groove 136, and ring 140 with outward facing groove 142 (not shown) that is similar to groove 136. Inner diameter 146 of the rings is large enough to permit passage through of connector 116 or bellows 118 at the ends of conduit 102, and of plug 122 or receptacle 124 at the ends of cable 100 so that the conduit and cable may be inserted intact with their terminations, through the pressure wall of a vessel by way of penetration plug 130.

The conduit, cable, or a wire, hereafter called "line" is dressed through semicircular cavity 150 in insert 154, and through semicircular cavity 156 in ring 140. The termination on the line is passed through opening 170.

Cavities 150 and 156 cooperate to form a hole for closely retaining but not necessarily immobilizing the line when insert 154 nests in ring 140.

Insert 154 nests by way of insert groove 158 in outward facing groove 142, so that inward facing face 160 of the insert and inward facing face 162 of ring 140 are planar. Likewise the outward facing faces of insert 154 and ring 140 are planar upon said nesting. Nested, they form ring and insert assembly 210 which provides a uniform compression surface that is of equal or slightly smaller diameter than resilient seal disk 212.

The diameter of ring and insert assembly 210 is smaller than that of resilient seal disk 212, so that the penetration plug can be installed in a wall with a close fit to seal disk 212, without interference with the wall from assembly 210.

The line is dressed through slit 174 of hole 178 and into hole 178 of resilient seal 212 by twisting the slit for access to hole 178.

The line which was passed through ring 140 and hole 178 is passed, with a termination, through ring 132, and is dressed through semicircular cavities 184 and 188. The line is retained in the hole formed by the cavities, as described earlier, when insert 198 nests in ring 132.

Insert 198 nests by way of insert groove 190 (not shown) which is similar to insert groove 158, in inward facing face 160 of insert 154, so that the outward facing face of the insert and outward facing face of ring 132 are planar. Likewise, inward facing face 216 of insert 198 and inward facing face 218 of ring 132 are planar upon said nesting. Nested, they form ring and insert assembly 220 which provides a uniform compression surface that is of equal or slightly smaller diameter than resilient seal disk 212.

When bolt 194, seating on washers 196 and engaging threads 202, draws insert 154 toward insert 198, resilient seal 212 is compressed between ring and insert assemblies 220 and 210, whereupon the resilient expands radially, forming a pressure seal about its periphery against the wall opening in which the penetration plug will be located, and within seal 212 about the line through hole 178.

If the wall in which the penetration plug is located is intended to be a pressure wall, the unused remaining holes in seal 212 may be plugged with rods having a lengths that are at least about equal to the thickness of seal 212.

The uniformity and percentage of compression area of the ring and insert assembly albeit with a large complement of holes is relatively high. This permits providing a penetration plug with a rubber seal that can be field punched with only as many holes as are needed, without concern over uneven displacement of the seal material compromising pressure sealing. Moreover a hole in the rubber seal may be of smaller diameter, within limits, than the corresponding holes in the ring and insert assemblies without detrimental effect on the seal around the line. A punched seal, therefore, can be customized to retain lines of various thickness.

Although the resilient seal, the ring and insert assembly, and the semicircular cavities for the lines are shown for clarity of the drawings as being round, it should be understood that they may be oval. A good seal remains possible with the penetration plug in an oval hole, and with oval lines, because of the high amount of compression area provided by the ring and insert assembly.

Figure 4:
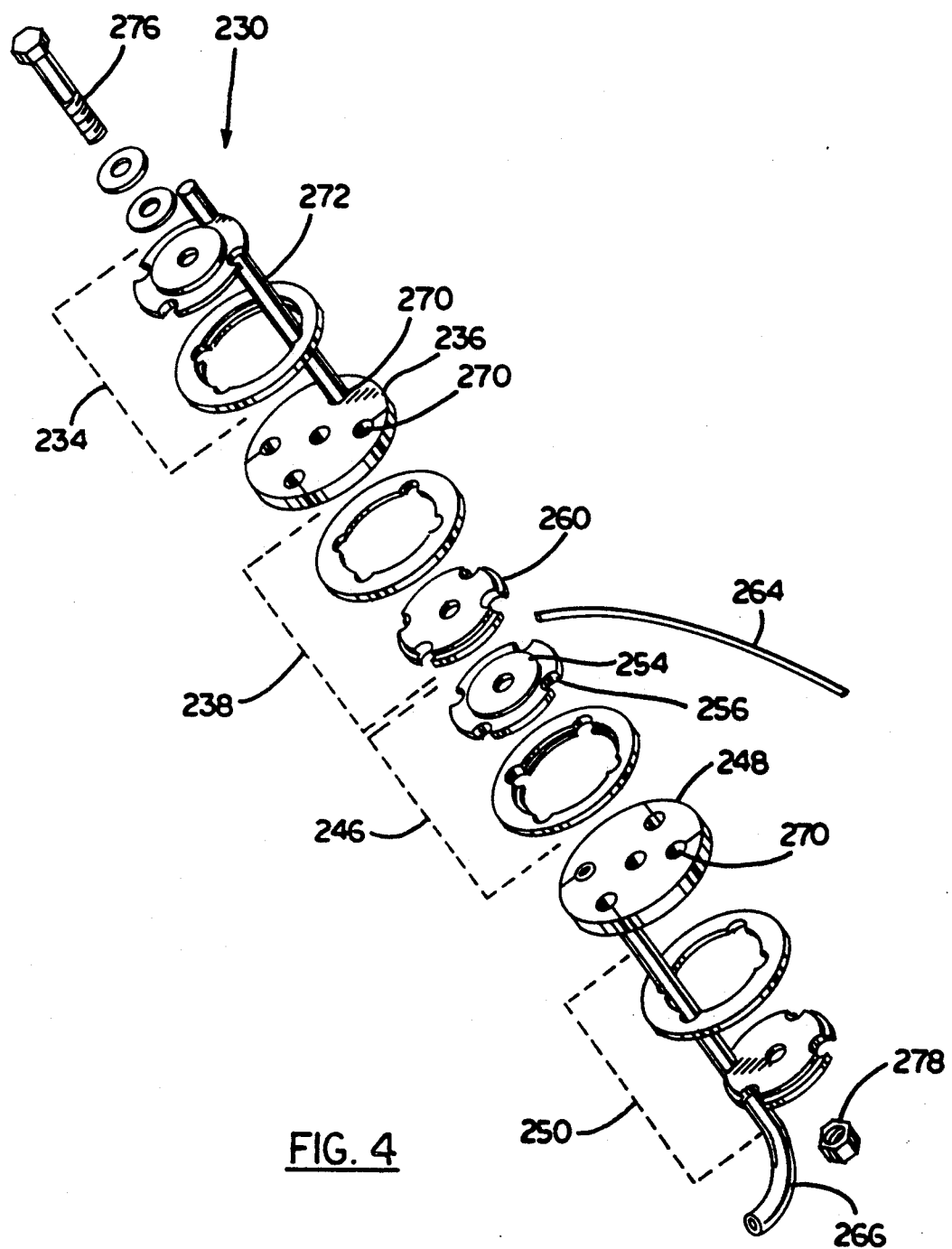
FIG. 4 is an exploded view of a two-stage penetration plug with access for pressure seal monitoring.

Penetration plug 230 shown in FIG. 4, comprises two plugs which are similar to the one in FIG. 3. Ring and insert assembly 234 and 238 compress seal disk 236, while ring and insert assembly 246 and 250 compress seal disk 248.

When insert plug 230 is installed in an opening in a wall, seal disks 236 and 248 provide parallel seals with the wall, creating a sealed compartment between them with a leak test annulus which can be monitored for pressure leakage across the seal plug. Boss 254 of insert 256 butts up against a boss (not shown) on insert 260, establishing a leak test annulus which is similar to leak test annulus 114, FIG. 2, established by abutting bosses 120 and inner wall 106 of wall opening 84.

The leak test annulus of penetration plug 230 is monitored by leak test passage 264 which is similar to leak test passage 110 shown in FIG. 2.

Alternatively, the cavity can be monitored by pressure monitor tube 266 which is similar to pressure monitor tube 48. Holes 270 in seal disks 236 and 248 are shown empty. In service they would be filled with wire, conduit, or whatever one wishes to traverse the pressure wall. Unused holes are closed by a pin 272 or other plug means, or are omitted from the seal disk. For example seal disk 248 has four holes 270, while seal disk 236 has only three holes 270.

Bolt 276 and nut 280 draw the elements of penetration plug together for the axial compression needed for sealing.

Figure 5:
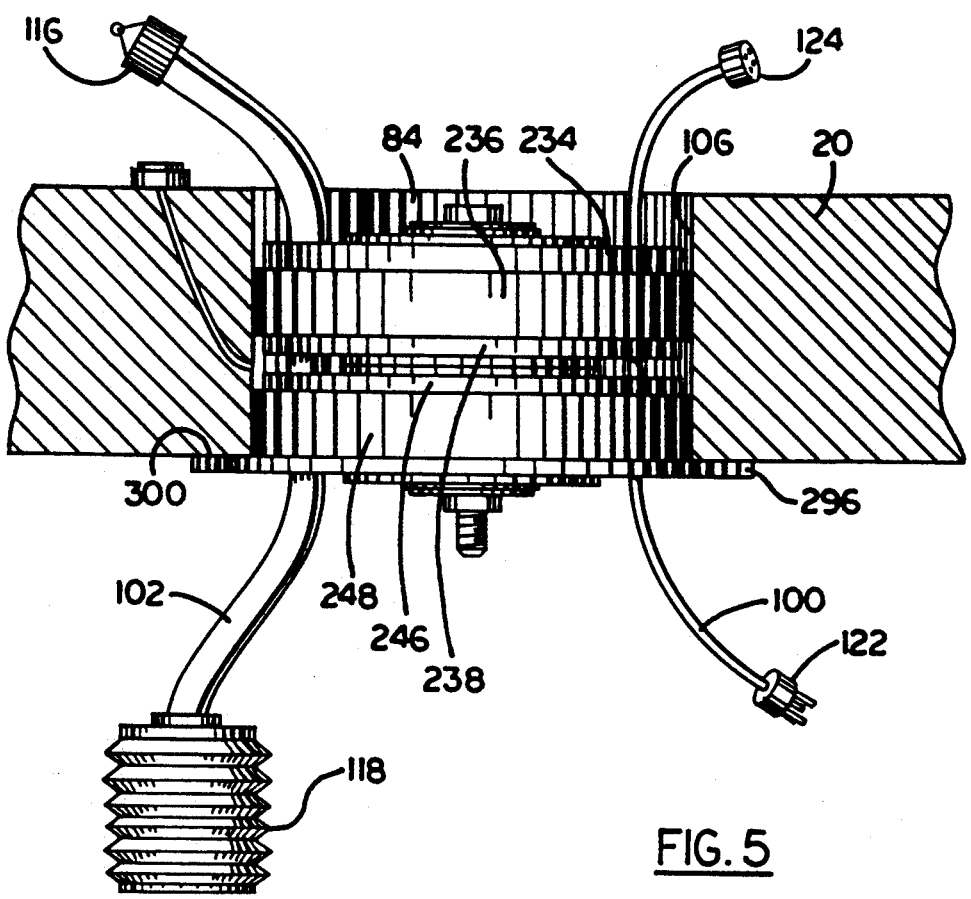
FIG. 5 is a partial cross section side view of another penetration plug.

The penetration plug shown in FIG. 5 includes elements that are similar to those of the plug shown in FIG. 4, with ring and insert assembly 250 replaced by ring and insert assembly 296. Ring and insert assembly 296 has a larger outer diameter 304 than the diameter of through-opening 84, so that assembly 296 prevents pressure from the bellows 118 side of mounting plate 20, moving the plug along the smooth inner wall 106 of through-opening 84.

Figure 6:
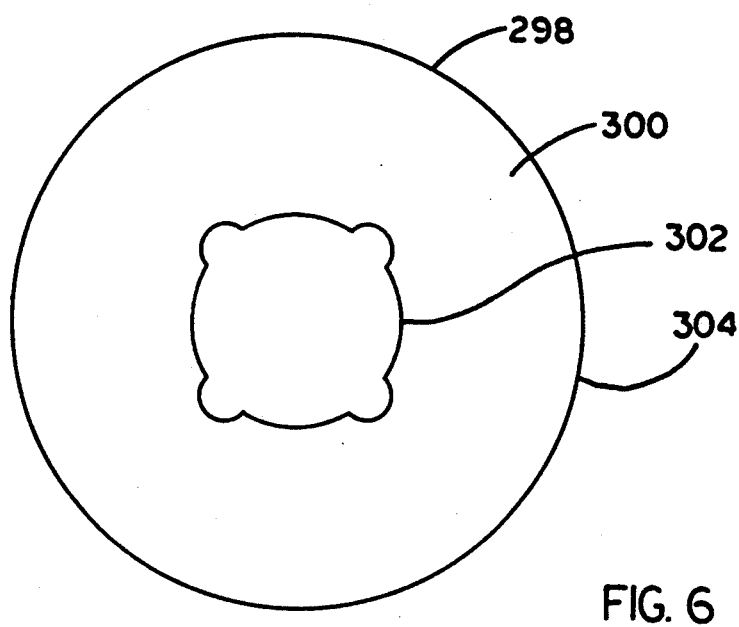
FIG. 6 is a front view of a ring of a penetration plug.

Referring to FIG. 6, enlarged face 300 to ring 298 of ring and insert assembly 296, for bearing against plate 20, is obtained by increasing outer diameter 304 while maintaining inner diameter 302 the same as the inner diameters of the rings of ring and insert assemblies 234, 238, and 246.

By the above description it is seen that a penetration plug is provided for passing wire, conduit, tubing, and other lines of various diameters, each of which may have a termination that is larger than the diameter of the line, through an opening in a pressure wall, without needing to remove the termination. The plug also provides means for monitoring for pressure loss across the penetration plug sealed in a wall. The plug may be customized for line diameter. It may be punched at the user's site to customize it for each application. The penetration plug also comprises an assembly of a plurality of plugs for mounting in a pressure wall and for monitoring seal status.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims. Drawing designator numbers are included in the claims in parenthesis for convenience of the reader, by way of explanation, and not of limitation of the claims.

What is claimed is:

1. A penetration plug apparatus for passing a line through a hole in an object, said plug comprising:

a first wall (212), said first wall being resilient and comprising a first opening (178) for receiving the line through said first wall, a second wall (140), stiffer than the first wall, said second wall comprising a second opening (170) for passing through of said second wall by said line, a third wall (132), stiffer than the first wall, the outer diameter of said third wall being unbroken, approximately the same radial size as the resilient first wall, and forming a single central third opening through said third wall, said third opening being for receiving a first insert (198), a first insert (198), said first insert being seated in said third opening of said third wall, said third wall and said first insert forming between them a fourth opening (188+184) smaller than, and incorporated within said third opening for passing said line between said third wall and insert, when the insert is seated in the third wall, and a first means for squeezing, for squeezing said first wall between said second wall, and said third wall and seated insert, for displacing material of said first wall against said line and against an inner wall of the hole of the object in which the plug is mounted, the outer diameter of said second wall forming said second opening through said second wall, said second opening also being for receiving a second insert (154), a second insert, said second insert being seated in said second opening of said second wall, said second insert and second wall forming between them a fifth opening (150+156) for said passing of said line through said second wall, by way of said fifth opening.

2. The penetration plug apparatus described in claim 1, said plug further comprising:

a portion of said first opening being completely through the outer diameter of said first wall, and said third wall traversing said portion.

3. The penetration plug apparatus described in claim 2, said plug further comprising:

for said seating of said third wall and first insert, a seat (136) in said third wall, said seat being shaped for slidingly unencumbered axial movement of said insert from insertion into said seat, to a fully seated position in said third wall.

4. The penetration plug apparatus described in claim 1, said plug further comprising:

a fourth wall, said fourth wall (248, FIG. 4) being resilient, a second means for squeezing (246 or 250, FIG. 4) said resilient fourth wall for displacing said fourth wall against said inner wall of said hole in which said plug is mounted, said second means for squeezing being operated by said first means for squeezing, and means for spacing said fourth wall from said second wall (238, FIG. 4), for forming a sealed cavity (114, FIG. 2) between said resilient first (236, FIG. 4) and fourth walls and said inner wall.

5. The penetration plug apparatus described in claim 4, said plug further comprising:

said second means for squeezing comprising a fifth wall, a boss (254, FIG. 4) on said fifth wall, said means for spacing said fourth wall from said second wall comprising said fifth wall and said boss.

6. The penetration plug apparatus described in claim 4, said apparatus further comprising:

a mounting plate comprising said hole in which said plug is mounted, said mounting plate being adapted for mounting said plate over said hole in said object, and fluid passage means oriented in said mounting plate for communication with said sealed cavity for monitoring said cavity.

7. A penetration plug apparatus for passing a line through a hole in an object, said plug comprising:

a first resilient wall (212) comprising a first opening (178) in said wall for the line through said wall, a second wall (140), stiffer than the first wall, said second wall forming a second opening (170) for passing through of said second wall by said line, a third wall (132), stiffer than the first wall, the outer diameter of said third wall being unbroken, approximately the same radial size as the resilient first wall, and forming a single central third opening through said third wall, said third opening being for receiving an insert (198), an insert (198), said insert being seated in said third opening of said third wall, said third wall and said insert forming between them a fourth opening smaller than, and incorporated within said third opening for passing said line between said third wall and insert, when the insert is seated in the third wall, and a first means for squeezing said first wall between said second wall, and said third wall and seated insert, for displacing material of said first wall against said line, and against an inner wall of the hole in which the plug is mounted, and for said seating of said third wall and insert, a seat in said third wall, said seat being shaped for slidingly unencumbered axial movement of said insert from insertion into said seat, to a fully seated position in said third wall, the outer diameter of said second wall forming said second opening through said second wall, said second opening also being for receiving a second insert (154), a second insert, said second insert being seated in said second opening of said second wall, said second insert and second wall forming between them a fifth opening (150+156) for said passing of said line through said second wall, by way of said fifth opening.

8. A method for sealingly passing a line with a termination of larger diameter than the line, through a hole in an object, said method comprising:

passing the line in any order desired, through;

a first opening (178) in a first resilient wall in which a portion of said first opening also opens completely (174) to the outer diameter of the wall, through a second opening (170) in a second wall (140) that is stiffer than the first wall, and through a third single central opening in a third wall (132), formed by the unbroken outer diameter of said third wall;

nesting of first insert (198) in said third opening in said third wall, said line fitting between said third wall and said first insert, in a smaller fourth opening (184+188) formed by said third wall and nested insert, nesting of a second insert (154) in said second opening in said second wall, said line fitting between said second wall and said second insert, in a smaller fifth opening formed by said second wall and said second insert, followed by;

squeezing said first wall between said second wall and said third wall with nested insert, including pressing on said first resilient wall against said first opening to the outer diameter, with a one of said second wall and said third walls as it traverses a portion of said first opening where it opens to the outer diameter, for displacing material of said first wall against said line, and against an inner wall of the hole in which the plug is mounted.

* * * * *